United States Patent
Satow et al.

(10) Patent No.: US 8,728,665 B2
(45) Date of Patent: May 20, 2014

(54) NEGATIVE ELECTRODE FOR LITHIUM ION SECONDARY BATTERY AND LITHIUM ION SECONDARY BATTERY INCLUDING THE SAME

(75) Inventors: Taiki Satow, Osaka (JP); Shinji Kasamatsu, Osaka (JP); Nobuhiro Hirano, Shiga (JP); Masaya Ugaji, Osaka (JP)

(73) Assignee: Panasonic Corporation, Osaka (JP)

( * ) Notice: Subject to any disclaimer, the term of this patent is extended or adjusted under 35 U.S.C. 154(b) by 403 days.

(21) Appl. No.: 13/320,461

(22) PCT Filed: Mar. 9, 2011

(86) PCT No.: PCT/JP2011/001387
§ 371 (c)(1),
(2), (4) Date: Nov. 14, 2011

(87) PCT Pub. No.: WO2011/121902
PCT Pub. Date: Oct. 6, 2011

(65) Prior Publication Data
US 2012/0064415 A1    Mar. 15, 2012

(30) Foreign Application Priority Data
Mar. 31, 2010   (JP) .................................. 2010-082858

(51) Int. Cl.
*H01M 4/62* (2006.01)
*H01M 4/02* (2006.01)
*H01M 10/40* (2006.01)

(52) U.S. Cl.
USPC .......................................... 429/217; 429/338

(58) Field of Classification Search
None
See application file for complete search history.

(56) References Cited

U.S. PATENT DOCUMENTS 7,611,804 B2 * 11/2009 Sakata et al. ............... 429/231.8
2003/0227275 A1 * 12/2003 Kishi et al. .................... 320/107

FOREIGN PATENT DOCUMENTS

| JP | 04-342966 | 11/1992 |
| JP | 05-101829 | 4/1993 |
| JP | 11-067213 | 3/1999 |
| JP | 2002-033105 | 1/2002 |
| JP | 2002-033106 | 1/2002 |
| JP | 2004-095391 | 3/2004 |

* cited by examiner

Primary Examiner — John S Maples
(74) Attorney, Agent, or Firm — McDermott Will & Emery LLP

(57) ABSTRACT

A negative electrode for a lithium ion secondary battery includes a negative electrode core member and a negative electrode mixture layer adhering to the negative electrode core member. The negative electrode mixture layer includes active material particles, a cellulose ether compound, and rubber particles. The cellulose ether compound has a degree of etherification of 0.25 or more and 0.7 or less and an average degree of polymerization of 20 or more and 1200 or less. The negative electrode mixture layer contains remaining particles including a water-insoluble portion of the cellulose ether compound and having a mean particle size of 1 μm or more and 75 μm or less. The bonding strength between the active material particles is 98 N/cm² or more.

8 Claims, 1 Drawing Sheet

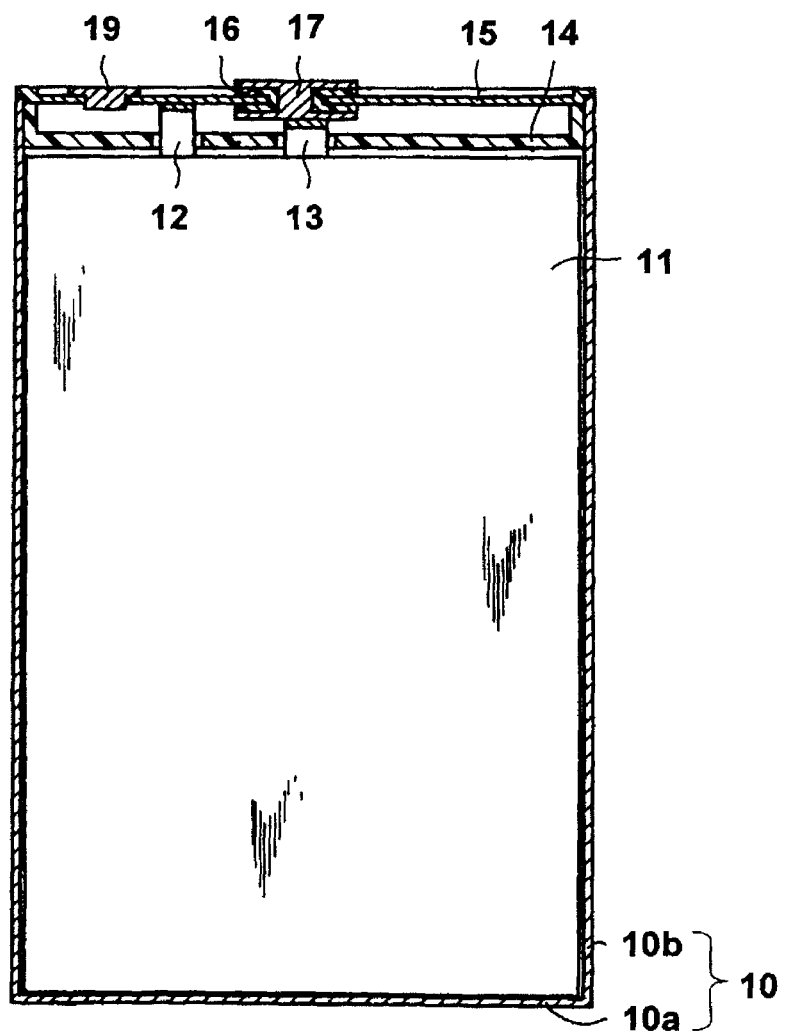

NEGATIVE ELECTRODE FOR LITHIUM ION SECONDARY BATTERY AND LITHIUM ION SECONDARY BATTERY INCLUDING THE SAME

RELATED APPLICATIONS

This application is the U.S. National Phase under 35 U.S.C. §371 of International Application No. PCT/JP2011/001387, filed on Mar. 9, 2011, which in turn claims the benefit of Japanese Application No. 2010-082858, filed on Mar. 31, 2010, the disclosures of which Applications are incorporated by reference herein.

TECHNICAL FIELD

This invention relates to lithium ion secondary batteries, and particularly to a negative electrode for a non-aqueous electrolyte secondary battery having a negative electrode mixture layer which includes active material particles with a graphite structure.

BACKGROUND ART

Various materials are used as the active materials for the negative electrodes of non-aqueous electrolyte secondary batteries, such as lithium ion secondary batteries. Among them, graphite materials are mainly used, and natural graphite, artificial graphite, graphitized mesophase carbon particles, graphitized mesophase carbon fibers, etc. are used. Among them, active material particles with a graphite structure, such as natural graphite, artificial graphite, and graphitized mesophase carbon particles, are promising.

In the case of using active material particles with a graphite structure, the active material particles and a binder are mixed in the presence of a predetermined dispersion medium, to form a negative electrode mixture slurry. Examples of binders usually used include: latex containing rubber particles such as styrene butadiene rubber (SBR), polybutadiene, or nitrile-butadiene polymer (NBR); and cellulose ether compounds such as carboxymethyl cellulose (CMC), carboxy ethyl cellulose (CEC), sodium salts thereof, and potassium salts thereof (PTLs 1 to 3). The negative electrode mixture slurry is applied onto a negative electrode core member comprising a copper foil or the like, and dried to form a negative electrode mixture layer. Thereafter, the negative electrode mixture layer is rolled with reduction rolls. The negative electrode mixture layer integrated with the negative electrode core member is cut to a predetermined shape, to obtain a negative electrode.

A lithium-containing transition metal oxide such as $LiCoO_2$, $LiNiO_2$, or $LiMn_2O_4$ is used as a positive electrode active material. The positive electrode active material is mixed with a predetermined dispersion medium, a binder, and a conductive agent to form a positive electrode mixture slurry. The positive electrode mixture slurry is applied onto a positive electrode core member comprising an aluminum foil or the like, dried, rolled, and cut in the same manner as the negative electrode, to obtain a positive electrode.

The negative electrode and the positive electrode thus obtained are opposed with a separator interposed therebetween, wound spirally, and placed in a case of a predetermined shape together with a non-aqueous electrolyte, to obtain a lithium ion secondary battery. The non-aqueous electrolyte is prepared by dissolving a lithium salt such as $LiPF_6$, $LiClO_4$, or $LiBF_4$ in a non-aqueous solvent such as ethylene carbonate (EC) or propylene carbonate (PC).

When such a battery is charged/discharged repeatedly, the active material particles with a graphite structure contained in the negative electrode expand and contract repeatedly, thereby weakening the bonding strength between the active material particles. As a result, the gaps between the active material particles may gradually increase, thereby causing the thickness of the negative electrode mixture layer to increase and causing the case to swell. To prevent swelling of the case due to an increase in the thickness of the negative electrode mixture layer, it is necessary to increase the bonding strength between the active material particles.

CITATION LIST

Patent Literature

PTL 1: Japanese Laid-Open Patent Publication No. Hei 4-342966
PTL 2: Japanese Laid-Open Patent Publication No. Hei 5-101829
PTL 3: Japanese Laid-Open Patent Publication No. 2002-33105

SUMMARY OF INVENTION

Technical Problem

PTL 1 and PTL 2 propose the use of a cellulose ether compound having an average degree of polymerization of 100 or more and 2000 or less and a degree of etherification of 0.5 or more and 2.5 or less as a binder for a negative electrode, to increase capacity retention rate. In this case, the bonding strength between the active material particles is low, and it is difficult to suppress an increase in the thickness of the negative electrode mixture layer. This is probably because the physical properties and distribution state of the cellulose ether compound are not controlled.

For example, when the proportion of the water-insoluble portion (non-soluble content) of the cellulose ether compound is large, remaining particles comprising the water-insoluble portion impede the bonding between the active material particles, thereby lowering the bonding strength between the active material particles. However, if the proportion of the water-insoluble portion is too small, high level bonding strength may not be obtained. Further, the bonding strength between the active material particles changes according to the particle size of the remaining particles comprising the water-insoluble portion.

Also, PTL 3 proposes the use of a cellulose ether compound having an average degree of polymerization of 1500 or more and 3000 or less and a product of the average degree of polymerization and a degree of etherification of 750 or more and less than 2000, to increase capacity. However, when the average degree of polymerization is 1500 or more, the viscosity of the negative electrode mixture slurry is too high, and it is thus difficult to evenly apply the negative electrode mixture slurry onto a negative electrode core member.

According to the invention, the physical properties and distribution state of a cellulose ether compound are optimized to suppress swelling of the lithium ion secondary battery due to repeated charge/discharge.

Solution to Problem

One aspect of the invention relates to a negative electrode for a lithium ion secondary battery, including a negative electrode core member and a negative electrode mixture layer adhering to the negative electrode core member. The negative electrode mixture layer includes active material particles with a graphite structure and a binder for bonding the active material particles. The binder includes a cellulose ether compound and rubber particles. The cellulose ether compound has a degree of etherification of 0.25 or more and 0.7 or less and an average degree of polymerization of 20 or more and 1200 or less. The negative electrode mixture layer contains remaining particles comprising a water-insoluble portion of the cellulose ether compound and having a mean particle size of 1 μm or more and 75 μm or less. The bonding strength between the active material particles is 98 N/cm$^2$ or more.

Another aspect of the invention relates to a lithium ion secondary battery including: a positive electrode; the above-described negative electrode; a separator interposed between the positive electrode and the negative electrode; and a non-aqueous electrolyte.

Advantageous Effects of Invention

By making the degree of etherification of the cellulose ether compound relatively small (degree of etherification: 0.25 or more and 0.7 or less) and making the average degree of polymerization relatively small (average degree of polymerization: 20 or more and 1200 or less), the balance between the viscosity and the bonding properties is optimized as the binder for the negative electrode mixture layer. Also, by controlling the state of the water-insoluble portion (non-soluble content) of the cellulose ether compound contained in the negative electrode mixture layer, high level bonding strength between the active material particles can be realized.

As a result, it is possible to provide a lithium ion secondary battery in which swelling (e.g., swelling of the case) due to repeated charge/discharge is suppressed.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWING

FIG. 1 is a front view of a partially cut-out prismatic lithium ion secondary battery according to one example of the invention.

DESCRIPTION OF EMBODIMENTS

The negative electrode for a lithium ion secondary battery according to the invention includes a negative electrode core member and a negative electrode mixture layer adhering to the negative electrode core member. The negative electrode core member is shaped like a sheet, and the negative electrode mixture layer is formed on one or both faces of the negative electrode core member. The negative electrode mixture layer includes active material particles with a graphite structure and a binder for bonding the active material particles. Such a negative electrode mixture layer can be produced by applying a negative electrode mixture slurry containing active material particles, a binder, and a liquid component (dispersion medium) onto a negative electrode core member, drying it, and rolling the resulting coating.

The binder includes a cellulose ether compound and rubber particles. The cellulose ether compound covers the surfaces of the active material particles to a suitable extent, and contributes to bonding and sliding properties of the active material particles covered with the cellulose ether compound. However, when the cellulose ether compound is used alone, the bonding strength between the active material particles becomes insufficient. When rubber particles are used in combination with the cellulose ether compound, the rubber particles are interposed between the active material particles covered with the cellulose ether compound, so that the active material particles are bonded in a point-to-point manner. Thus, the active material particles are not excessively covered with the binder, and the strength of the negative electrode mixture layer is also heightened.

The cellulose ether compound used in the invention has a relatively small degree of etherification and a relatively small average degree of polymerization, and has a mean particle size of 2 μm or more and 400 μm or less when it is used as a raw material of the negative electrode mixture slurry.

As used herein, a cellulose ether compound refers to a compound made by etherifying a cellulose compound, and a cellulose compound refers to a polymer composed of a plurality of anhydroglucose units. In the invention, cellulose ether compounds such as carboxymethyl cellulose (CMC), carboxy ethyl cellulose (CEC), hydroxyethyl cellulose, sodium salts thereof, potassium salts thereof, and lithium salts thereof can be used. Among them, in terms of heat resistance, prices, chemical stability, etc., carboxymethyl cellulose is preferable. In terms of chemical stability during charge/discharge cycles, affinity for non-aqueous electrolyte, etc., carboxymethyl cellulose sodium salt (CMC-Na) is particularly preferable.

Carboxymethyl cellulose sodium salt is prepared, for example, by reacting pulp with sodium monochloroacetate and caustic soda. Pulp includes cellulose composed of a large number of polymerized anhydroglucose units. The hydroxyl groups in the cellulose are replaced by monochloroacetic acid to synthesize CMC-Na. The CMC-Na contains impurities such as sodium chloride, sodium carbonate, and sodium glycolate, but such impurities can be removed by a sulfuric acid purification method, a methanol purification method, a water solvent method, etc.

The CMC-Na from which the impurities have been removed are dried and crushed to a predetermined particle size. For crushing, a jet mill, a pulverizer, an impact mill, a hammer mill, etc., can be used. Among them, a jet mill is preferable.

The method for classifying the CMC-Na powder is roughly classified into three: gravity classification, centrifugal classification, and inertial classification. Among them, centrifugal classification is preferable since it can provide a powder with a small mean particle size. For centrifugal classification, it is particularly preferable to use a cyclone classifier.

The degree of etherification is a measure which indicates the amount of ether bonds, and refers to the degree of substitution, i.e., how many of the hydroxyl groups contained in the cellulose compound have been replaced with carboxy methyl group(s) (—$CH_2COOH$), sodium carboxy methyl group(s) (—$CH_2COONa$), ammonium carboxy methyl group(s) (—$CH_2COONH_4$), etc. A cellulose compound has three hydroxyl groups per anhydroglucose unit. Thus, the degree of etherification can be changed in the range of 0 to 3. When one of the hydroxyl groups in every unit is etherified, the degree of etherification is 1.0.

A cellulose ether compound with a degree of etherification of 0.7 or less has a relatively large number of hydroxyl groups in the molecular chains, so the crosslinked sites of the molecular chains by hydrogen bonds increase. Thus, the bonding strength between the active material particles is increased. However, a cellulose ether compound with a degree of etherification of less than 0.25 has insufficient water solubility, thus being not suited as a raw material for the negative electrode mixture slurry. Such a cellulose ether compound tends to swell with the dispersion medium of the slurry, thereby interfering with dispersion.

As described above, the degree of etherification affects the network structure of the cellulose ether compound. By making the degree of etherification 0.7 or less, the cellulose ether compound readily forms a network structure, which increases the bonding strength between the active material particles. When a cellulose ether compound has a well-developed network structure, it is thought to cover the surfaces of the active material particles to a suitable extent without adhering closely to the surfaces thereof. This ensures lithium ion acceptance of the negative electrode and heighten coulombic efficiency. In order to provide a negative electrode having a good balance between the bonding strength of the active material particles and coulombic efficiency, the degree of etherification is preferably 0.35 to 0.7, and more preferably 0.4 to 0.7.

The degree of etherification can be determined by various methods. For example, in the case of carboxymethyl cellulose sodium salt (CMC-Na), the degree of etherification can be determined by boiling an incinerated sample in sulfuric acid, adding a phenolphthalein indicator thereto, and performing a back titration of excessive acid with potassium hydroxide. Specifically, it can be determined as follows.

[Method for Measuring Degree of Etherification]

First, the alkalinity A of CMC-Na is measured in the following manner.

1 g of a CMC-Na powder is weighed and dissolved in 200 ml of water in a flask. Then, 5 mL of 0.05 mol/mL sulfuric acid is added thereto, and the resulting mixture is boiled for 10 minutes and cooled to room temperature. The resulting solution is titrated with a 0.1 mol/mL aqueous potassium hydroxide solution. Also, a blank test is performed in the same manner without adding a CMC-Na powder. The alkalinity A is calculated from the results of titration and blank test and the following formula (1):

$$A=(e-d)f/M \quad (1)$$ where e: the volume (mL) of the aqueous potassium hydroxide solution required in the titration of the blank test, d: the volume (mL) of the aqueous potassium hydroxide solution required in the titration of the solution of CMC-Na and sulfuric acid f: the titer (g/mL) of the aqueous potassium hydroxide solution M: the weight of the CMC-Na powder Next, the degree of etherification DS is measured in the following manner.

0.5 g of the CMC-Na powder is weighed, wrapped in filter paper, and incinerated in a crucible. This is cooled and introduced into a beaker, and 250 mL of water and 35 mL of 0.05 mol/mL sulfuric acid are added thereto. The resulting mixture is boiled for 30 minutes and cooled to room temperature. The resulting solution is titrated with a 0.1 mol/mL aqueous potassium hydroxide solution. The degree of etherification DS is calculated from the result of titration and the following formulas (2) and (3):

$$DS=162W/(10000-80W) \quad (2)$$

$$W=(af'-bf)/M-A \quad (3)$$ where a: the volume (mL) of sulfuric acid
f': the titer (g/mL) of sulfuric acid
b: the volume (mL) of potassium hydroxide An increase in the crosslinked sites due to a decrease in the degree of etherification usually tends to increase the viscosity of the negative electrode mixture slurry and decrease the workability in the negative electrode production process. However, in the invention, by setting the average degree of polymerization to 20 or more and 1200 or less, a decrease in workability is prevented. When the average degree of polymerization of the cellulose ether compound is 20 or more and 1200 or less, the entanglement of the molecular chains decreases, and the viscosity of the negative electrode mixture slurry does not increase. However, if the average degree of polymerization is lowered to 20 or less, the bonding strength deteriorates significantly due to a decrease in the entanglement of the molecular chains. In terms of higher bonding strength and workability, the average degree of polymerization is preferably 500 or more and 1200 or less.

[Method for Measuring Average Degree of Polymerization]

First, using a capillary viscometer (available from Kusano Science Corporation, Cannon-Fenske type), the limiting viscosity η is determined. The determined value is substituted in the formula (4) below to calculate the weight-average molecular weight M, and the calculated value is converted to an average degree of polymerization.

$$\eta=6.46\times10^{-16}M \quad (4)$$

Even when using a cellulose ether compound having a degree of etherification and an average degree of polymerization within the above ranges, the degree of etherification of the molecules of the compound varies to some extent. When the degree of etherification decreases, the proportion of the water-insoluble portion of the cellulose ether compound tends to increase. If the proportion of the water-insoluble portion is excessive, remaining particles comprising the water-insoluble portion impedes the bonding of the active material particles, thereby lowering the bonding strength between the active material particles.

Therefore, although a cellulose ether compound having high water solubility and little water-insoluble portion has been believed to be desirable in the conventional art, it is desirable that the cellulose ether compound contain a certain amount of water-insoluble portion, in order to achieve high level bonding strength between the active material particles. Specifically, when the mean particle size of the cellulose ether compound powder used as a raw material of the negative electrode mixture slurry is set to 2 μm or more and 400 μm or less, the particle size and distribution state of the remaining particles comprising the water-insoluble portion in the negative electrode mixture layer are optimized. As a result, high level bonding strength between the active material particles can be realized.

In order to make the particle size and distribution state of the remaining particles more preferable, it is preferable to set the mean particle size of the cellulose ether compound powder used as a raw material to 10 μm or more and 200 μm or less. As used herein, mean particle size refers to the particle size at a cumulative volume of 50% in a volume basis particle size distribution, and can be measured by using a laser diffraction-scattering particle size distribution analyzer (e.g., Microtrac available from Nikkiso Co., Ltd.). For a particle size distribution measurement, it is preferable to perform a dry measurement, or a wet measurement using ethanol as the dispersion medium. Since the cellulose ether compound powder does not swell with ethanol, a wet measurement using ethanol can provide the same particle size distribution as that of a dry measurement.

Since the remaining particles comprising the water-insoluble portion of the cellulose ether compound are pressed against the adjacent active material particles in the negative electrode mixture layer in the rolling step, they are thought to increase the bonding strength between the active material particles. When the remaining particles having a mean particle size of 1 μm or more and 75 μm or less, preferably 2.5 μm or more and 40 μm or less, are dispersed in the negative electrode mixture layer, each of the water-insoluble portion and the water-soluble portion contributes to increasing the bonding strength. Thus, compared with the absence of the water-insoluble portion, the bonding strength between the active material particles is thought to increase.

The particle size and distribution state of the remaining particles comprising the water-insoluble portion of the cellulose ether compound in the negative electrode mixture layer can be measured and evaluated, for example, by the following first or second method.

In the first method, first, a given section of the negative electrode mixture layer before rolling is observed with an electron microscope (SEM). The observed area is, for example, an area of 100,000 μm$^2$. The number n of the remaining particles having a particle size (largest diameter) of 0.1 μm (lower limit) or more and 150 μm (upper limit) or less, observed in this area, is determined, and the particles sizes of n particles are integrated. The integrated value ID is then divided by the number n to determine the average particle size. The determined value is defined as the particle size of the remaining particles. It should be noted that the remaining particles outside the lower limit and the upper limit are excluded from the calculation.

In the second method, first, a part of the negative electrode mixture layer is peeled from the core member, and 1 g of the electrode mixture is mixed with 100 g of distilled water of 25° C. The resultant mixture is left for 12 hours, and the active material particles are separated for removal. The filtrate was passed through a filter with a filtration accuracy of 100 nm, and the filter with the remaining particles comprising the water-insoluble portion of the cellulose ether compound is then dried in the air at 60° C. for 12 hours. The dried filter is immersed in ethanol to disperse the remaining particles in the ethanol. The resulting liquid dispersion is analyzed by a laser diffraction-scattering particle size distribution analyzer to obtain the particle size distribution of the remaining particles comprising the water-insoluble portion of the cellulose ether compound and the rubber particles. Since there is a large difference between the particle size distributions of the two kind of particles, they can be readily separated. The particle size of the remaining particles at a cumulative volume of 50% in the volume basis particle size distribution is the intended value.

The number of the remaining particles per 100,000 μm$^2$ of the observed area is, for example 0.5 or more and 10 or less. If the number of the remaining particles is too large, the bonding strength between the active material particles may decrease, and if it is too few, high level bonding strength may not be obtained.

The amount of the remaining particles contained in 1 g of the electrode mixture can be determined by separating the remaining particles comprising the water-insoluble portion from the above-mentioned filtrate with a filter whose filtration accuracy is smaller than the particle size of the rubber particles, drying them, measuring their weight, and subtracting the weight of the rubber particles therefrom. The amount of the remaining particles comprising the water-insoluble portion in the negative electrode mixture layer is preferably 0.0017 part by weight or more and 0.17 part by weight or less per 100 parts by weight of the active material particles, and more preferably 0.017 to 0.14 part by weight. By controlling the amount of the remaining particles comprising the water-insoluble portion in the above range, the distribution state of the remaining particles is optimized, which is effective for increasing the bonding strength between the active material particles.

Also, the cellulose ether compound powder used as a raw material preferably contains a water-insoluble portion in an amount of 1% by weight or more and 30% by weight or less. When the water-insoluble portion is in this range, the amount of the remaining particles per 100 parts by weight of the active material particles contained in the negative electrode mixture layer can be easily controlled at 0.0017 part by weight or more and 0.17 part by weight or less. Such control is possible, for example, by passing a liquid mixture of the cellulose ether compound powder and water through a mesh with a predetermined opening for filtration.

The proportion of the water-insoluble portion contained in the cellulose ether compound powder used as a raw material can be determined by the following method.

First, 1 g of the cellulose ether compound powder is weighed, and the water-soluble portion contained in the 1 g sample is completely dissolved in 1000 mL of distilled water of 25° C. The resulting aqueous solution is passed through a filter having a predetermined weight and a filtration accuracy of 100 nm, and the filter containing the water-insoluble portion is dried at 60° C. in the air for 12 hours. From the difference between the weight of the dried filter containing the water-insoluble portion and the initial value of weight of the filter, the weight of the water-insoluble portion contained in 1 g of the cellulose ether compound powder is calculated. From the calculated value, the weight proportion of the water-insoluble portion is calculated.

The amount of the cellulose ether compound contained in the negative electrode mixture layer is preferably 0.9 part by weight or more and 2.7 parts by weight or less per 100 parts by weight of the active material particles, more preferably 1.0 part by weight or more and 2.5 parts by weight or less, and even more preferably 1.5 parts by weight or more and 2.2 parts by weight or less. When the amount of the cellulose ether compound is 0.9 part by weight or more, the negative electrode mixture slurry has sufficient viscosity, and sufficient bonding strength between the active material particles is ensured. Also, by making the amount of the cellulose ether compound 2.7 parts by weight or less, it is possible to prevent the active material particles from being excessively covered with the cellulose ether compound and to minimize the relative decrease of the negative electrode capacity.

The rubber particles can be, for example, styrene butadiene rubber (SBR), styrene conjugated diene rubber, or nitrile butadiene rubber, and are preferably styrene butadiene rubber containing a total of styrene units and butadiene units of 60 mol or more.

Styrene butadiene rubber is suited as the binder for the negative electrode mixture layer, since it is stable at the potential of the electrode of the lithium ion secondary battery and has suitable viscosity and elasticity. Preferable monomer units other than the styrene unit and the butadiene unit include an acrylonitrile unit, an acrylic acid unit, a methacrylic acid unit, a 2-ethylhexyl acrylate unit, and a butyl acrylate unit. Such styrene butadiene rubber has a glass transition point of −30 to +40° C., good bonding properties between the active material particles in the temperature range in which the battery is used, and stability at the negative electrode potential. The ratio of the styrene units to the total of the styrene units and the butadiene units is preferably 30 to 70 mol %.

The mean particle size of the rubber particles is preferably 50 nm to 200 nm, more preferably 50 to 150 nm, and most preferably 100 to 120 nm. When rubber particles with such small particle sizes are used, the cellulose ether compound and the rubber particles effectively cooperate to bond the active material particles more firmly.

The mean particle size of the rubber particles is measured, for example, with a laser diffraction-scattering particle size distribution analyzer (e.g., Microtrac available from Nikkiso Co., Ltd.). Specifically, a cumulative volume distribution is obtained, and the particle size $D_{50V}$ at a cumulative volume of 50% from large particle size side is determined as the volume basis mean particle size.

The amount of the rubber particles contained in the negative electrode mixture layer is 0.5 to 1.5 parts by weight per 100 parts by weight of the active material particles, and preferably 0.6 to 1.2 parts by weight. By setting the amount of the rubber particles to 0.5 part by weight or more, the negative electrode mixture layer has sufficient strength. Also, by setting the amount of the rubber particles to 1.5 parts by weight or less, it is possible to prevent the active material particles from being excessively covered with the rubber particles, suppress an increase in internal resistance, and minimize the relative decrease of the negative electrode capacity.

When the cellulose ether compound covers the surfaces of the active material particles, the active material particles have good sliding properties among the particles. Thus, when the negative electrode mixture layer is rolled, the rubber particles are subjected to a sufficient shearing force and act on the surfaces of the active material particles effectively. Also, the rubber particles with a small particle size have a high probability of coming into contact with the surfaces of the active material particles, thereby exhibiting sufficient bonding properties in small amounts.

The active material particles with a graphite structure include natural graphite, artificial graphite, and graphitized mesophase carbon particle. The diffraction pattern of the active material particles measured by a wide-angle X-ray diffraction analysis has a peak attributed to the (101) face and a peak attributed to the (100) face. With respect to the ratio of the intensity I(101) of the peak attributed to the (101) face to the intensity I(100) of the peak attributed to the (100) face, preferably 0.01<I(101)/I(100)<0.25, and more preferably 0.08<I(101)/I(100)<0.2. The intensity of the peak as used herein refers to the height of the peak.

The mean particle size of the active material particles is preferably 14 to 25 μm, and more preferably 16 to 23 μm. When the mean particle size is within the above range, the sliding properties of the active material particles in the negative electrode mixture layer are improved, and the state of packing of the active material particles becomes good, which is advantageous to increasing the bonding strength between the active material particles.

As used herein, mean particle size refers to $D_{50V}$ in the cumulative volume distribution of the active material particles.

The cumulative volume distribution of the active material particles can also be measured with a commercially available laser diffraction-scattering particle size distribution analyzer.

The average circularity of the active material particles is preferably 0.90 to 0.95, and more preferably 0.91 to 0.94. When the average circularity is within the above range, the sliding properties of the active material particles in the negative electrode mixture layer are improved, which is advantageous to improving the packing properties of the active material particles and increasing the bonding strength between the active material particles. The average circularity is expressed as $4\pi S/L^2$ (S represents the area of the orthogonally projected image of each graphite particle and L represents the length of the circumference of the orthogonally projected image). For example, the average circularity of given 100 active material particles is preferably in the above range.

The specific surface area S of the active material particles is preferably 3 to 7 $m^2/g$, and more preferably 3.5 to 6.5 $m^2/g$. When the specific surface area is within the above range, the sliding properties of the active material particles in the negative electrode mixture layer are improved, which is advantageous to increasing the bonding strength between the active material particles. Also, the preferable amount of the binder covering the surfaces of the active material particles can be reduced. Specific surface area is measured by the BET method.

The negative electrode core member is preferably a metal foil. The metal foil is preferably a copper foil, a copper alloy foil, or the like. In particular, a copper foil (which can contain up to 0.2 mol % of other components than copper) is preferable, and an electrolytic copper foil is particularly preferable.

The invention uses a cellulose ether compound having a degree of etherification of 0.25 to 0.7 and an average degree of polymerization of 20 or more and 1200 or less, which readily forms a network structure. Also, the invention optimizes the particle size and distribution state of the remaining particles comprising the water-insoluble portion of the cellulose ether compound in the negative electrode mixture layer. Therefore, the active material particles bond firmly. Specifically, the bonding strength between the active material particles in the negative electrode mixture layer is as high as 98 $N/cm^2$ or more, or 150 to 200 $N/cm^2$. Since the bonding strength between the active material particles is increased, even when the battery is repeatedly charged/discharged, swelling of the negative electrode mixture layer is suppressed. As a result, swelling of the case of the lithium ion secondary battery is also suppressed.

Since the negative electrode mixture layer having the above-described bonding strength between the active material particles has been compressed to a high density, the density of the negative electrode mixture layer is as high as 1.5 to 1.9 $g/cm^3$. That is, the invention can provide a negative electrode having a high capacity, but having good lithium ion acceptance and good coulombic efficiency. Also, it should be noted that the higher density the negative electrode mixture layer has, the more it swells, but such swelling can be suppressed because of the high level bonding strength between the active material particles.

The bonding strength between the active material particles is measured in the following manner.

[Method for Measuring Bonding Strength Between Graphite Particles]

The negative electrode with the negative electrode mixture layer formed on each side is cut to prepare a negative electrode piece of 2 cm×3 cm. The negative electrode mixture layer is peeled from one face of the negative electrode piece, while the negative electrode mixture layer on the other face is left. The other face of the negative electrode piece is affixed to the adhesive layer of a double sided tape (part number: No. 515, available from Nitto Denko Corporation) affixed to a glass plate. Subsequently, the negative electrode core member is separated from the negative electrode piece to expose the negative electrode mixture layer. In this manner, a measurement sample comprising the negative electrode mixture layer affixed to one face of the double sided tape is prepared.

The double sided tape side of the measurement sample is attached to the tip of a measurement probe (tip diameter 0.2 cm) of a tack tester (trade name: TAC-II available from RHESCA Corporation Limited). Then, under the conditions shown below, the measurement probe is pushed into the negative electrode mixture layer and pulled away to perform a peel test. In the peel test, the largest load required for separating the active material particles is measured. The value obtained by dividing the largest load by the cross sectional area (0.031 cm$^2$) of the measurement probe is the bonding strength between the active material particles (N/cm$^2$).

<Test Condition>

The speed at which the measurement probe is pushed in: 30 mm/min

The time for which the measurement probe is pushed in: 10 seconds

The load for pushing the measurement probe in: 3.9 N

The speed at which the measurement probe is pulled away: 600 mm/min

The lithium ion secondary battery of the invention includes the above-described negative electrode, a positive electrode, a separator interposed therebetween, and a non-aqueous electrolyte. While the shape of the battery is not particularly limited, it is cylindrical, prismatic, flat, coin-shaped, etc.

FIG. 1 is a perspective view schematically showing the structure of a lithium ion secondary battery according to one embodiment of the invention. In FIG. 1, a part of the battery is cut out to show the structure of the main part of the battery. This battery is a prismatic battery comprising a flat electrode assembly 11 and a non-aqueous electrolyte contained in a prismatic battery case 10.

The electrode assembly 11 includes a positive electrode, a negative electrode, and a separator (which are not shown). A positive lead 12 connects a positive electrode core member with a seal plate 15 functioning as a positive terminal. A negative lead 13 connects a negative electrode core member with a negative terminal 17. A gasket 16 insulates the seal plate 15 from the negative terminal 17. The seal plate 15 is attached to the open end of the prismatic battery case 10 to seal the prismatic battery case 10. The seal plate 15 is provided with an injection hole (not shown). The injection hole is sealed with a seal stopper 19 after a non-aqueous electrolyte has been injected into the prismatic battery case 10. The electrode assembly 11 can be produced by interposing the separator between the positive electrode and the negative electrode, winding them, and pressing the wound assembly into a flat shape.

The positive electrode can be produced by, for example, applying a positive electrode mixture slurry including a positive electrode active material, a conductive agent such as carbon black, and a binder such as polyvinylidene fluoride onto a positive electrode core member such as an aluminum foil, drying it, and rolling it. The positive electrode active material is preferably a lithium-containing transition metal composite oxide. Representative examples include LiCoO$_2$, LiNiO$_2$, LiMn$_2$O$_4$, LiMnO$_2$, and Li$_x$Ni$_y$M$_z$Me$_{1-(y+z)}$O$_{2+d}$. Among them, lithium-nickel containing composite oxides are preferable since they can provide high capacity.

Examples of lithium-nickel containing composite oxides include those represented by the general formula (1):

$$Li_xNi_yM_zMe_{1-(y+z)}O_{2+d} \quad (1)$$

where M is at least one element selected from the group consisting of Co and Mn, Me is at least one element selected from the group consisting of Al, Cr, Fe, Mg, and Zn, 0.98≤x≤1.10, 0.3≤w≤1.0, 0≤z≤0.7, 0.9≤(y+z)≤1.0, and −0.01≤d≤0.01.

The separator is commonly a microporous film made of polyethylene or polypropylene. The thickness of the separator is, for example, 10 to 30 μm.

The non-aqueous electrolyte has lithium ion conductivity, and includes a lithium salt, a non-aqueous solvent, and if necessary, various additives.

Examples of lithium salts include LiClO$_4$, LiBF$_4$, LiPF$_6$, LiAlCl$_4$, LiSbF$_6$, LiSCN, LiCF$_3$SO$_3$, and LiCF$_3$CO$_2$. They may be used singly or in combination. It is preferable to add a 0.5 to 2 mol lithium salt to 1 liter of the non-aqueous solvent.

Examples of non-aqueous solvents include cyclic carbonic acid esters, chain carbonic acid esters, and cyclic carboxylic acid esters. Cyclic carbonic acid esters include propylene carbonate (PC) and ethylene carbonate (EC). Chain carbonic acid esters include diethyl carbonate (DEC), ethyl methyl carbonate (EMC), and dimethyl carbonate (DMC). Cyclic carboxylic acid esters include γ-butyrolactone and γ-valerolactone.

The non-aqueous solvent preferably includes a small amount of an additive such as vinylene carbonate (VC) or vinyl ethylene carbonate.

It is common to use a solvent mixture having suitable viscosity and polarity prepared by mixing one or more cyclic carbonic acid esters such as EC and PC and one or more chain carbonic acid esters such as DEC, EMC, and DMC. For example, a solvent mixture of PC, EC, and DEC is used. In this case, if the ratio of EC or DEC becomes high and the ratio of PC becomes low, gas evolution tends to increase due to charge/discharge cycles. Gas evolution can cause swelling of the battery case. Also, the lithium salt tends to become difficult to ionize.

While PC can reduce gas evolution, it is incompatible with active material particles with a graphite structure; during charge, the graphite surface may be decomposed, thereby resulting in a significant decrease in coulombic efficiency. However, by covering the surfaces of the active material particles with the cellulose ether compound, exposure of the graphite surface can be reduced, and it is thus possible to use a non-aqueous solvent containing a relatively large amount of PC. However, if the ratio of PC becomes too high, the internal resistance of the battery tends to increase due to an increase in the viscosity of the non-aqueous solvent. Therefore, the ratio of PC contained in the non-aqueous solvent is preferably 10% by volume or more and 70% by volume or less.

The method for covering the surfaces of the active material particles with the cellulose ether compound is not particularly limited. For example, the active material particles are mixed with water and the cellulose ether compound, and the resulting mixture is dried. By drying the mixture, the cellulose ether compound efficiently adheres to the surfaces of the active material particles, so that the coating rate of the active material particle surface with the cellulose ether compound is heightened.

Next, the dried mixture, the remaining binder, and a liquid component are mixed to prepare a negative electrode mixture slurry. In this step, the rubber particles adhere to the surfaces of the active material particles covered with the cellulose ether compound. The resulting negative electrode mixture slurry is applied onto a negative electrode core member and dried. The method for applying the negative electrode mixture slurry onto the negative electrode core member is not particularly limited. For example, using a die coater, the negative electrode mixture slurry is applied onto a roll of the negative electrode core member in a predetermined pattern. The drying temperature, drying time, and drying method of the resulting coating are not particularly limited. The dried coating is rolled to obtain a negative electrode. The rolling step heightens the bonding strength between the negative electrode core member and the negative electrode mixture layer and the bonding strength between the active material particles.

The invention is hereinafter described specifically by way of Examples and Comparative Examples. However, the invention is not to be construed as being limited to the following Examples.

Example 1

(a) Synthesis of CMC-Na Powder

Using a shredder (biaxial shredder TIGER SHRED available from Fujitex Corporation), pulp chips were crushed, and 191 g of the resulting pulp powder and 5730 mL of a 2-propanol aqueous solution with a concentration of 88% by weight were stirred to prepare a slurry. Thereafter, the slurry was left until its temperature lowered to room temperature, and 24 g of sodium hydroxide was added thereto to produce alkali cellulose, which was then cooled to 10° C. or lower with ice. 55 g of monochloroacetic acid was added to the ice-cooled alkali cellulose, which was then stirred for 5 minutes, cooled to 5° C., and allowed to stand for 2 hours. Thereafter, the slurry was introduced into a flask, boiled in a hot water bath, and allowed to react at the boiling point for 80 minutes. Subsequently, 5% hydrochloric acid was excessively introduced into the flask, and the slurry was stirred for 5 minutes and cooled to room temperature. The resulting slurry was washed with an 80% aqueous methanol solution and filtrated, and this was repeated five times to remove chloride ions. The resulting product was dried at 80° C. for 3 hours to obtain a solid of CMC-Na. The CMC-Na (hereinafter simply referred to as CMC) had a degree of etherification of 0.7 and an average degree of polymerization of 1200. The degree of etherification and the average degree of polymerization were measured by the methods described above.

The CMC thus prepared was crushed with a jet mill (100AFG available from Hosokawa Micron Corporation) for 25 minutes, and passed through a mesh with an opening of 80 µm to obtain a CMC powder with a particle size of 80 µm or less (mean particle size 40 µm). The amount of the water-insoluble portion contained in the CMC was measured by the above-described method, and it was 3% by weight.

(b) Pretreatment of Active Material Particles

The CMC (degree of etherification 0.7, average degree of polymerization 1200) was mixed with water to obtain a CMC/water mixed liquid containing 0.7% by weight of the CMC. 100 parts by weight of natural graphite particles (mean particle size 18 µm, BET specific surface area 4.8 m$^2$/g) and 100 parts by weight of the CMC/water mixed liquid were mixed and stirred, and the resulting mixture was dried at 80° C. for 5 hours to cover the graphite particle surface with CMC-Na. The amount of CMC per 100 parts by weight of the graphite particles was 0.7 part by weight.

(c) Preparation of Negative Electrode Mixture Slurry

First, 1 part by weight of the CMC powder prepared in (a) above was mixed with a suitable amount of water. The mean particle size of the particles contained in the mixed liquid, comprising the water-insoluble portion, was measured with a laser diffraction-scattering particle size distribution analyzer (Microtrac available from Nikkiso Co., Ltd.), and it was 40 µm. Also, the amount thereof was 0.03 part by weight (3% by weight). Thereafter, the CMC/water mixed liquid, 100 parts by weight of the active material particles covered with CMC and prepared in (b) above, and 1 part by weight of SBR (mean particle size 150 nm, glass transition point 25° C.) were mixed to prepare a negative electrode mixture slurry. It should be noted that the SBR mixed with the other components was in the form of a liquid dispersion using water as the dispersion medium (available from JSR Corporation, SBR content 48% by weight).

(d) Preparation of Negative Electrode

The negative electrode mixture slurry prepared in (c) above was applied onto both faces of a negative electrode core member (electrolytic copper foil, thickness 10 µm) with a die coater. At this time, the gap of the die coater was adjusted so that the thickness of the coating on one face was 300 µm. Thereafter, the coatings were dried at 110° C. and rolled at a line pressure of 490 N/cm with reduction rollers to form negative electrode mixture layers having a thickness of 145 µm and a density of 1.6 g/cm$^3$. The negative electrode mixture layers and the negative electrode core member were cut to a predetermined shape to produce a negative electrode. The amount of the remaining particles comprising the insoluble portion of the CMC per 100 parts by weight of the active material particles contained in the negative electrode mixture layer is 0.051 part by weight.

The bonding strength between the active material particles of the negative electrode thus obtained was measured by the above-described method using TAC-II of RHESCA Corporation Limited, and it was 118 N/cm$^2$. After the completion of the measurement, the peeled face of the evaluation sample on the measurement probe side was observed, and it was confirmed that debonding occurred between the active material particles.

Also, a section of the negative electrode mixture layer was observed by the above-mentioned method, and the mean particle size of the remaining particles comprising the water-insoluble portion of the CMC was 40 µm.

(e) Preparation of Positive Electrode

A positive electrode mixture slurry was prepared by adding 4 parts by weight of polyvinylidene fluoride as a binder to 100 parts by weight of LiCoO$_2$ as a positive electrode active material, and mixing them with a suitable amount of NMP. The positive electrode mixture slurry was applied onto both faces of a 15-µm thick aluminum foil as a positive electrode core member, dried, and rolled to form positive electrode mixture layers. The positive electrode mixture layers and the positive electrode core member were cut to a predetermined shape to produce a positive electrode.

(f) Preparation of Non-Aqueous Electrolyte

A non-aqueous electrolyte was prepared by dissolving LiPF$_6$ at a concentration of 1 mol/L in a solvent mixture of 30% by volume of EC, 50% by volume of PC, and 20% by volume of DEC. The non-aqueous electrolyte was allowed to contain 3% by weight of VC.

(g) Assembly of Battery

A prismatic lithium ion secondary battery illustrated in FIG. 1 was produced.

The negative electrode and the positive electrode thus obtained were wound with a separator comprising a 20-µm thick polyethylene microporous film (A089 available from Celgard K. K.) interposed therebetween, to form a flat electrode assembly 11 with a substantially oval section. The electrode assembly 11 was placed in an aluminum prismatic battery case 10. The battery case 10 has a bottom 10a, a side wall 10b, and an open top. The main flat portion of the side wall 10b has a rectangular shape and a thickness of 80 µm. Thereafter, an insulator 14 for preventing a short circuit between the battery case 10 and a positive lead 12 or a negative lead 13 was mounted on the electrode assembly 11. Subsequently, a rectangular seal plate 15 having, at the center, a negative terminal 17 surrounded by an insulating gasket 16 was fitted to the opening of the battery case 10. The negative lead 13 was connected to the negative terminal 17. The positive lead 12 was connected to the seal plate 15. The edge of the opening and the seal plate 15 were welded with a laser to seal the opening of the battery case 10. Thereafter, 2.5 g of the non-aqueous electrolyte was injected into the battery case 10 from the injection hole of the seal plate 15. Lastly, the injection hole was closed with a seal stopper 19 by welding, to complete a prismatic lithium ion secondary battery with a height of 50 mm, a width of 34 mm, an inner space thickness of 5.2 mm, and a design capacity of 850 mAh.

(Evaluation of Prismatic Battery)

In an environment of 20° C., charge/discharge cycles were repeated 500 times under the following conditions. The initial capacity was determined by dividing the discharge capacity at the first cycle by the weight of the active material in the negative electrode mixture layers. Also, the ratio of the discharge capacity to the charge capacity at the first cycle was determined as the initial efficiency. The swelling of the battery was evaluated as the rate of increase of the thickness of the battery after 500 cycles relative to the thickness after the charge at the first cycle.

Constant current charge: Charge current value 850 mA/End-of-charge voltage 4.2 V Constant voltage charge: Charge voltage value 4.2 V/End of charge current 100 mA Constant current discharge: Discharge current value 1700 mA/End-of-discharge voltage 3.0 V

Example 2

CMC was synthesized in the same manner as in Example 1 except that the amount of sodium hydroxide added was set to 13.7 g and that the amount of monochloroacetic acid added was set to 31.4 g. The synthesized CMC was crushed for 15 minutes and passed through a mesh with an opening of 320 μm, to obtain a CMC powder with a particle size of 320 μm or less (mean particle size 160 μm). The content of the water-insoluble portion in the CMC was 20% by weight.

The synthesized CMC had a degree of etherification of 0.4 and an average degree of polymerization of 1200.

The CMC powder was mixed with a suitable amount of water, and the mixed liquid was passed through a mesh with an opening of 80 μm for filtration. Part of the water-insoluble portion of the CMC was removed by the mesh. The mean particle size of the water-insoluble portion (remaining particles) of the CMC contained in the mixed liquid after the filtration was 40 μm. Using the CMC/water mixed liquid (CMC amount: 1.7 parts by weight), a negative electrode and a prismatic battery were produced under the same conditions of Example 1, and evaluated in the same manner as in Example 1.

The amount of the remaining particles comprising the insoluble portion of the CMC per 100 parts by weight of the active material particles contained in the negative electrode mixture layer was 0.051 part by weight.

The bonding strength between the active material particles was 147 N/cm$^2$.

A section of the negative electrode mixture layer was observed, and the mean particle size of the remaining particles comprising the water-insoluble portion of the CMC was 40 μm.

Example 3

CMC was synthesized in the same manner as in Example 1 except that in the synthesis of a CMC powder, the amount of sodium hydroxide added was set to 10.3 g while the amount of monochloroacetic acid added was set to 23.6 g. The synthesized CMC was crushed for 15 minutes and passed through a mesh with an opening of 350 μm to obtain a CMC powder with a particle size of 350 μm or less (mean particle size 175 μm). The content of the water-insoluble portion in the CMC was 30% by weight.

The synthesized CMC had a degree of etherification of 0.25 and an average degree of polymerization of 1200.

The CMC powder was mixed with a suitable amount of water, and the mixed liquid was passed through a mesh with an opening of 80 μm for filtration. The mean particle size of the water-insoluble portion (remaining particles) of the CMC contained in the mixed liquid after the filtration was 40 μm. Using this CMC/water mixture (CMC amount: 1.7 parts by weight), a negative electrode and a prismatic battery were produced under the same conditions of Example 1, and evaluated in the same manner as in Example 1.

The amount of the remaining particles comprising the insoluble portion of the CMC per 100 parts by weight of the active material particles contained in the negative electrode mixture layer was 0.051 part by weight.

The bonding strength between the active material particles was 167 N/cm$^2$.

A section of the negative electrode mixture layer was observed, and the mean particle size of the remaining particles comprising the water-insoluble portion of the CMC was 40 μm.

Example 4

A CMC powder was synthesized in the same manner as in Example 2 except that the reaction time at the boiling point was set to 2 minutes.

The synthesized CMC had a degree of etherification of 0.4 and an average degree of polymerization of 20.

The content of the water-insoluble portion in the CMC was 20% by weight.

Using the CMC thus prepared, a prismatic battery was produced and evaluated in the same manner as in Example 2.

In the slurry of this example, sedimentation was observed after three days.

The amount of the remaining particles comprising the insoluble portion of the CMC per 100 parts by weight of the active material particles contained in the negative electrode mixture layer was 0.051 part by weight.

The bonding strength between the active material particles was 98 N/cm$^2$.

A section of the negative electrode mixture layer was observed, and the mean particle size of the remaining particles comprising the water-insoluble portion of the CMC was 40 μm.

Example 5

A CMC powder was synthesized in the same manner as in Example 2 except that the reaction time at the boiling point was set to 33 minutes.

The synthesized CMC had a degree of etherification of 0.4 and an average degree of polymerization of 500.

The content of the water-insoluble portion in the CMC was 20% by weight.

Using this CMC, a prismatic battery was produced and evaluated in the same manner as in Example 2.

The amount of the remaining particles comprising the insoluble portion of the CMC per 100 parts by weight of the active material particles contained in the negative electrode mixture layer was 0.051 part by weight.

The bonding strength between the active material particles was 118 N/cm².

A section of the negative electrode mixture layer was observed, and the mean particle size of the remaining particles comprising the water-insoluble portion of the CMC was 40 μm.

Example 6

CMC was synthesized in the same manner as in Example 3 except that the amount of sodium hydroxide added was set to 10.3 g, that the amount of monochloroacetic acid added was set to 23.6 g, and that the reaction time at the boiling point was set to 2 minutes.

The synthesized CMC had a degree of etherification of 0.25 and an average degree of polymerization of 20.

The content of the water-insoluble portion in the CMC was 30% by weight.

Using this CMC, a prismatic battery was produced and evaluated in the same manner as in Example 3.

The amount of the remaining particles comprising the insoluble portion of the CMC per 100 parts by weight of the active material particles contained in the negative electrode mixture layer was 0.051 part by weight.

The bonding strength between the active material particles was 127 N/cm².

A section of the negative electrode mixture layer was observed, and the mean particle size of the remaining particles comprising the water-insoluble portion of the CMC was 40 μm.

Example 7

The same procedure as that of Example 2 was taken except that CMC was crushed for 35 minutes and passed through a mesh with an opening of 8 μm to prepare a CMC powder with a particle size of 8 μm or less and a mean particle size of 4 μm.

The CMC powder was mixed with a suitable amount of water, and the mixed liquid was passed through a mesh with an opening of 2 μm for filtration. The mean particle size of the water-insoluble portion contained in the mixed liquid after the filtration was 1 μm. Using this CMC/water mixture (CMC amount: 1.7 parts by weight), a negative electrode and a prismatic battery were produced under the same conditions of Example 2 and evaluated in the same manner as in Example 1.

The amount of the remaining particles comprising the insoluble portion of the CMC per 100 parts by weight of the active material particles contained in the negative electrode mixture layer was 0.051 part by weight.

The bonding strength between the active material particles was 103 N/cm².

A section of the negative electrode mixture layer was observed, and the mean particle size of the remaining particles comprising the water-insoluble portion of the CMC was 1 μm.

Example 8

The same procedure as that of Example 2 was taken except that CMC was crushed for 25 minutes and passed through a mesh with an opening of 20 μm to prepare a CMC powder with a particle size of 20 μm or less and a mean particle size of 10 μm.

The CMC powder was mixed with a suitable amount of water, and the mixed liquid was passed through a mesh with an opening of 5 μm for filtration. The mean particle size of the water-insoluble portion contained in the mixed liquid after the filtration was 2.5 μm. Using this CMC/water mixture (CMC amount: 1.7 parts by weight), a negative electrode and a prismatic battery were produced under the same conditions of Example 2 and evaluated in the same manner as in Example 1.

The amount of the remaining particles comprising the insoluble portion of the CMC per 100 parts by weight of the active material particles contained in the negative electrode mixture layer was 0.051 part by weight.

The bonding strength between the active material particles was 137 N/cm².

A section of the negative electrode mixture layer was observed, and the mean particle size of the remaining particles comprising the water-insoluble portion of the CMC was 2.5 μm.

Example 9

The same procedure as that of Example 2 was taken except that CMC was crushed for 10 minutes and passed through a mesh with an opening of 600 μm to prepare a CMC powder with a particle size of 600 μm or less and a mean particle size of 300 μm.

The CMC powder was mixed with a suitable amount of water, and the mixed liquid was passed thorough a mesh with an opening of 150 μm for filtration. The mean particle size of the water-insoluble portion contained in the mixed liquid after the filtration was 75 μm. Using this CMC/water mixture (CMC amount: 1.7 parts by weight), a negative electrode and a prismatic battery were produced under the same conditions of Example 2, and evaluated in the same manner as in Example 1.

The bonding strength between the active material particles was 108 N/cm².

The amount of the remaining particles comprising the insoluble portion of the CMC per 100 parts by weight of the active material particles contained in the negative electrode mixture layer was 0.051 part by weight.

A section of the negative electrode mixture layer was observed, and the mean particle size of the remaining particles comprising the water-insoluble portion of the CMC was 75 μm.

Example 10

The same procedure as that of Example 2 was taken except that CMC was crushed for 15 minutes, and that the crushed CMC was passed through a mesh with an opening of 160 μm to prepare a CMC powder with a particle size of 160 μm or less and a mean particle size of 80 μm.

The CMC powder was mixed with a suitable amount of water, and the mixed liquid was passed through a mesh with an opening of 80 μm for filtration. The mean particle size of the water-insoluble portion contained in the mixed liquid after the filtration was 40 μm. Using this CMC/water mixture (CMC amount: 1.7 parts by weight), a negative electrode and a prismatic battery were produced under the same conditions of Example 2, and evaluated in the same manner as in Example 1.

The bonding strength between the active material particles was 108 N/cm².

The amount of the remaining particles comprising the insoluble portion of the CMC per 100 parts by weight of the active material particles contained in the negative electrode mixture layer was 0.17 part by weight.

A section of the negative electrode mixture layer was observed, and the mean particle size of the remaining particles comprising the water-insoluble portion of the CMC was 40 μm.

Example 11

The same procedure as that of Example 2 was taken except that CMC was crushed for 15 minutes, and that the crushed CMC was passed through a mesh with an opening of 200 μm to prepare a CMC powder with a particle size of 200 μm or less and a mean particle size of 100 μm.

The CMC powder was mixed with a suitable amount of water, and the mixed liquid was passed through a mesh with an opening of 80 μm for filtration. The mean particle size of the water-insoluble portion contained in the mixed liquid after the filtration was 40 μm. Using this CMC/water mixture (CMC amount: 1.7 parts by weight), a negative electrode and a prismatic battery were produced under the same conditions of Example 2, and evaluated in the same manner as in Example 1.

The bonding strength between the active material particles was 167 N/cm$^2$.

The amount of the remaining particles comprising the insoluble portion of the CMC per 100 parts by weight of the active material particles contained in the negative electrode mixture layer was 0.14 part by weight.

A section of the negative electrode mixture layer was observed, and the mean particle size of the remaining particles comprising the water-insoluble portion of the CMC was 40 μm.

Example 12

The same procedure as that of Example 2 was taken except that CMC was crushed for 15 minutes, and that the crushed CMC was passed through a mesh with an opening of 400 μm to prepare a CMC powder with a particle size of 400 μm or less and a mean particle size of 200 μm.

The CMC powder was mixed with a suitable amount of water, and the mixed liquid was passed through a mesh with an opening of 80 μm for filtration. The mean particle size of the water-insoluble portion contained in the mixed liquid after the filtration was 40 μm. Using this CMC/water mixture (CMC amount: 1.7 parts by weight), a negative electrode and a prismatic battery were produced under the same conditions of Example 2, and evaluated in the same manner as in Example 1.

The bonding strength between the active material particles was 137 N/cm$^2$.

The amount of the remaining particles comprising the insoluble portion of the CMC per 100 parts by weight of the active material particles contained in the negative electrode mixture layer was 0.017 part by weight.

A section of the negative electrode mixture layer was observed, and the mean particle size of the remaining particles comprising the water-insoluble portion of the CMC was 40 μm.

Example 13

The same procedure as that of Example 2 was taken except that CMC was crushed for 10 minutes, and that the crushed CMC was passed through a mesh with an opening of 800 μm to prepare a CMC powder with a particle size of 800 μm or less and a mean particle size of 400 μm.

The CMC powder was mixed with a suitable amount of water, and the mixed liquid was passed through a mesh with an opening of 80 μm for filtration. The mean particle size of the water-insoluble portion contained in the mixed liquid after the filtration was 40 μm. Using this CMC/water mixture (CMC amount: 1.7 parts by weight), a negative electrode and a prismatic battery were produced under the same conditions of Example 2, and evaluated in the same manner as in Example 1.

The bonding strength between the active material particles was 98 N/cm$^2$.

The amount of the remaining particles comprising the insoluble portion of the CMC per 100 parts by weight of the active material particles contained in the negative electrode mixture layer was 0.0017 part by weight.

A section of the negative electrode mixture layer was observed, and the mean particle size of the remaining particles comprising the water-insoluble portion of the CMC was 40 μm.

Example 14

A prismatic battery was produced and evaluated in the same manner as in Example 2 except that in the preparation of a negative electrode mixture slurry, the amount of CMC added was set to 0.2 part by weight.

The bonding strength between the active material particles was 98 N/cm$^2$.

A section of the negative electrode mixture layer was observed, and the mean particle size of the remaining particles comprising the water-insoluble portion of the CMC was 40 μm. Also, the amount of remaining particles was 0.027 part by weight per 100 parts by weight of the active material particles.

Example 15

A prismatic battery was produced and evaluated in the same manner as in Example 2 except that in the preparation of a negative electrode mixture slurry, the amount of CMC added was set to 2.0 part by weight.

The bonding strength between the active material particles was 100 N/cm$^2$.

A section of the negative electrode mixture layer was observed, and the mean particle size of the remaining particles comprising the water-insoluble portion of the CMC was 40 μm. Also, the amount of the remaining particles was 0.081 part by weight per 100 parts by weight of the active material particles.

Example 16

A prismatic battery was produced and evaluated in the same manner as in Example 2 except that in the preparation of a negative electrode mixture slurry, the amount of CMC added was set to 3.0 parts by weight.

The bonding strength between the active material particles was 108 N/cm$^2$.

A section of the negative electrode mixture layer was observed, and the particle size of the remaining particles comprising the water-insoluble portion of the CMC was 40 μm. Also, the amount of the remaining particles was 0.111 part by weight per 100 parts by weight of the active material particles.

Example 17

A prismatic battery was produced and evaluated in the same manner as in Example 2 except that in the preparation of a negative electrode mixture slurry, the amount of SBR added was set to 0.2 part by weight.

The bonding strength between the active material particles was 98 N/cm$^2$.

Example 18

A prismatic battery was produced and evaluated in the same manner as in Example 2 except that in the preparation of a negative electrode mixture slurry, the amount of SBR added was set to 0.5 part by weight.

The bonding strength between the active material particles was 108 N/cm$^2$.

Example 19

A prismatic battery was produced and evaluated in the same manner as in Example 2 except that in the preparation of a negative electrode mixture slurry, the amount of SBR added was set to 1.5 parts by weight.

The bonding strength between the active material particles was 147 N/cm$^2$.

Example 20

A prismatic battery was produced and evaluated in the same manner as in Example 2 except that in the preparation of a negative electrode mixture slurry, the amount of SBR added was set to 3.0 parts by weight.

The bonding strength between the active material particles was 176 N/cm$^2$.

Example 21

A prismatic battery was produced and evaluated in the same manner as in Example 2 except that in the preparation of a negative electrode mixture slurry, graphite particles whose surfaces were not covered with CMC were used to prepare the negative electrode mixture slurry, and that a non-aqueous electrolyte was prepared by dissolving LiPF$_6$ at a concentration of 1 mol/L in a solvent mixture of 80% by volume of EC and 20% by volume of DEC.

The bonding strength between the active material particles was 108 N/cm$^2$.

A section of the negative electrode mixture layer was observed, and the particle size of remaining particles comprising the water-insoluble portion of the CMC was 40 μm. Also, the amount of the remaining particles was 0.03 part by weight per 100 parts by weight of the active material particles.

Example 22

A prismatic battery was produced and evaluated in the same manner as in Example 2 except for the use of the same non-aqueous electrolyte as that of Example 21.

Example 23

A prismatic battery was produced and evaluated in the same manner as in Example 2 except that a non-aqueous electrolyte was prepared by using a solvent mixture of 70% by volume of EC, 10% by volume of PC, and 20% by volume of DEC.

Example 24

A prismatic battery was produced and evaluated in the same manner as in Example 2 except that a non-aqueous electrolyte was prepared by using a solvent mixture of 10% by volume of EC, 70% by volume of PC, and 20% by volume of DEC.

Example 25

A prismatic battery was produced and evaluated in the same manner as in Example 2 except that a non-aqueous electrolyte was prepared by using a solvent mixture of 80% by volume of PC and 20% by volume of DEC.

Comparative Example 1

A prismatic battery was produced and evaluated in the same manner as in Example 1 except that in the synthesis of a CMC powder, the amount of sodium hydroxide added was set to 30.9 g and that the amount of monochloroacetic acid added was set to 70.7 g.

The synthesized CMC had a degree of etherification of 0.9 and an average degree of polymerization of 1200.

The bonding strength between the active material particles was 49 N/cm$^2$.

A section of the negative electrode mixture layer was observed, but remaining particles comprising the water-insoluble portion of the CMC were not observed.

Comparative Example 2

The same procedure as that of Example 1 was taken except that in the synthesis of a CMC powder, the amount of sodium hydroxide added was set to 3.4 g, and that the amount of monochloroacetic acid added was set to 7.9 g.

The synthesized CMC had a degree of etherification of 0.1 and an average degree of polymerization of 1200.

Using this CMC, an attempt to prepare a negative electrode mixture slurry was made in the same manner as in Comparative Example 1. However, the CMC did not sufficiently dissolve in water, and a negative electrode mixture slurry could not be obtained.

Comparative Example 3

The same procedure as that of Example 2 was taken except that in the synthesis of a CMC powder, the boiling point was maintained for 100 minutes and that the crushing time of the CMC was set to 25 minutes.

The resulting CMC had a degree of etherification of 0.4 and an average degree of polymerization of 1500.

Using this CMC, an attempt to prepare a negative electrode mixture slurry was made in the same manner as in Comparative Example 1. However, the viscosity of the negative electrode mixture slurry became very high, and it was difficult to prepare a homogeneous negative electrode mixture slurry.

Comparative Example 4

A prismatic battery was produced and evaluated in the same manner as in Comparative Example 1 except that in the synthesis of a CMC powder, the reaction time at the boiling point was set to 2 minutes and that the crushing time of the CMC was set to 25 minutes.

The synthesized CMC had a degree of etherification of 0.9 and an average degree of polymerization of 20.

The bonding strength between the active material particles was 39 N/cm².

In the slurry of this comparative example, sedimentation was observed after three days.

A section of the negative electrode mixture layer was observed, but remaining particles comprising the water-insoluble portion of the CMC were not observed.

Comparative Example 5

The same procedure as that of Example 2 was taken except that CMC was crushed for 35 minutes and passed through a mesh with an opening of 2 μm to prepare a CMC powder with a particle size of 2 μm or less and a mean particle size of 1 μm.

The CMC powder was mixed with a suitable amount of water, and the mixed liquid was passed through a mesh with an opening of 0.5 μm for filtration. The mixed liquid after the filtration contained the water-insoluble portion with a mean particle size of 0.25 μm. Using this CMC/water mixture, a negative electrode and a prismatic battery were produced under the same conditions of Example 2, and evaluated in the same manner as in Example 1.

The bonding strength between the active material particles was 49 N/cm².

A section of the negative electrode mixture layer was observed, and the particle size of remaining particles comprising the water-insoluble portion of the CMC was 0.25 μm. Also, the amount of the remaining particles was 0.051 part by weight per 100 parts by weight of the active material particles.

Comparative Example 6

The same procedure as that of Example 2 was taken except that CMC was crushed for 10 minutes and passed through a mesh with an opening of 800 μm to prepare a CMC powder with a particle size of 800 μm or less and a mean particle size of 400 μm.

The CMC powder was mixed with a suitable amount of water, and the mixed liquid was passed through a mesh with an opening of 200 μm for filtration. The mixed liquid after the filtration contained the water-insoluble portion with a mean particle size of 100 μm. Using this CMC/water mixture, a negative electrode and a prismatic battery were produced under the same conditions of Example 2, and evaluated in the same manner as in Example 1.

The bonding strength between the active material particles was 69 N/cm².

A section of the negative electrode mixture layer was observed, and the particle size of remaining particles comprising the water-insoluble portion of the CMC was 100 μm. Also, the amount of the remaining particles was 0.051 part by weight per 100 parts by weight of the active material particles.

Tables 1 to 3 show the production conditions of the prismatic batteries of Examples and Comparative Examples.

Tables 4 to 5 show the evaluation results of the prismatic batteries.

TABLE 1

| Example | Degree of etherification | Average degree of polymerization | Mean particle size of raw material CMC (μm) | Amount of CMC (part by weight) | Amount of water-insoluble portion (part by weight) per 100 parts by weight of active material | Mean particle size of remaining particles (μm) | Bonding strength between active material particles (N) | Amount of SBR (part by weight) | CMC coating on graphite surface | Solvent composition EC/PC/DEC (% by volume) |
|---|---|---|---|---|---|---|---|---|---|---|
| 1 | 0.7 | 1200 | 40 | 1.7 | 0.051 | 40 | 118 | 1.0 | Present | 30/50/20 |
| 2 | 0.4 | 1200 | 160 | 1.7 | 0.051 | 40 | 147 | 1.0 | Present | 30/50/20 |
| 3 | 0.25 | 1200 | 175 | 1.7 | 0.051 | 40 | 167 | 1.0 | Present | 30/50/20 |
| 4 | 0.4 | 20 | 160 | 1.7 | 0.051 | 40 | 98 | 1.0 | Present | 30/50/20 |
| 5 | 0.4 | 500 | 160 | 1.7 | 0.051 | 40 | 118 | 1.0 | Present | 30/50/20 |
| 6 | 0.25 | 20 | 175 | 1.7 | 0.051 | 40 | 127 | 1.0 | Present | 30/50/20 |
| 7 | 0.4 | 1200 | 4 | 1.7 | 0.051 | 1 | 103 | 1.0 | Present | 30/50/20 |
| 8 | 0.4 | 1200 | 10 | 1.7 | 0.051 | 2.5 | 137 | 1.0 | Present | 30/50/20 |
| 9 | 0.4 | 1200 | 300 | 1.7 | 0.051 | 75 | 108 | 1.0 | Present | 30/50/20 |
| 10 | 0.4 | 1200 | 80 | 1.7 | 0.17 | 40 | 108 | 1.0 | Present | 30/50/20 |
| 11 | 0.4 | 1200 | 100 | 1.7 | 0.14 | 40 | 167 | 1.0 | Present | 30/50/20 |
| 12 | 0.4 | 1200 | 200 | 1.7 | 0.017 | 40 | 137 | 1.0 | Present | 30/50/20 |
| 13 | 0.4 | 1200 | 400 | 1.7 | 0.0017 | 40 | 98 | 1.0 | Present | 30/50/20 |

TABLE 2

| Example | Degree of etherification | Average degree of polymerization | Mean particle size of raw material CMC (μm) | Amount of CMC (part by weight) | Amount of water-insoluble portion (part by weight) per 100 parts by weight of active material | Mean particle size of remaining particles (μm) | Bonding strength between active material particles (N) | Amount of SBR (part by weight) | CMC coating on graphite surface | Solvent composition EC/PC/DEC (% by volume) |
|---|---|---|---|---|---|---|---|---|---|---|
| 14 | 0.4 | 1200 | 160 | 0.9 | 0.027 | 40 | 98 | 1.0 | Present | 30/50/20 |
| 15 | 0.4 | 1200 | 160 | 2.7 | 0.081 | 40 | 100 | 1.0 | Present | 30/50/20 |
| 16 | 0.4 | 1200 | 160 | 3.7 | 0.111 | 40 | 108 | 1.0 | Present | 30/50/20 |
| 17 | 0.4 | 1200 | 160 | 1.7 | 0.051 | 40 | 98 | 0.2 | Present | 30/50/20 |
| 18 | 0.4 | 1200 | 160 | 1.7 | 0.051 | 40 | 108 | 0.5 | Present | 30/50/20 |
| 19 | 0.4 | 1200 | 160 | 1.7 | 0.051 | 40 | 147 | 1.5 | Present | 30/50/20 |
| 20 | 0.4 | 1200 | 160 | 1.7 | 0.051 | 40 | 176 | 3.0 | Present | 30/50/20 |
| 21 | 0.4 | 1200 | 160 | 1.0 | 0.03 | 40 | 108 | 1.0 | Absent | 80/0/20 |
| 22 | 0.4 | 1200 | 160 | 1.7 | 0.051 | 40 | 147 | 1.0 | Present | 80/0/20 |
| 23 | 0.4 | 1200 | 160 | 1.7 | 0.051 | 40 | 147 | 1.0 | Present | 70/10/20 |

TABLE 2-continued

| Example | Degree of etherification | Average degree of polymerization | Mean particle size of raw material CMC (μm) | Amount of CMC (part by weight) | Amount of water-insoluble portion (part by weight) per 100 parts by weight of active material | Mean particle size of remaining particles (μm) | Bonding strength between active material particles (N) | Amount of SBR (part by weight) | CMC coating on graphite surface | Solvent composition EC/PC/DEC (% by volume) |
|---|---|---|---|---|---|---|---|---|---|---|
| 24 | 0.4 | 1200 | 160 | 1.7 | 0.051 | 40 | 147 | 1.0 | Present | 10/70/20 |
| 25 | 0.4 | 1200 | 160 | 1.7 | 0.051 | 40 | 147 | 1.0 | Present | 0/80/20 |

TABLE 3

| Comparative example | Degree of etherification | Average degree of polymerization | Mean particle size of raw material CMC (μm) | Amount of CMC (part by weight) | Amount of water-insoluble portion (part by weight) per 100 parts by weight of active material | Mean particle size of remaining particles (μm) | Bonding strength between active material particles (N) | Amount of SBR (part by weight) | CMC coating on graphite surface | Solvent composition EC/PC/DEC (% by volume) |
|---|---|---|---|---|---|---|---|---|---|---|
| 1 | 0.9 | 1200 | 40 | 1.7 | 0 | — | 49 | 1.0 | Present | 30/50/20 |
| 2 | 0.1 | 1200 | 40 | 1.7 | 0.051 | 40 | — | 1.0 | Present | — |
| 3 | 0.4 | 1500 | 40 | 1.7 | 0.051 | 40 | — | 1.0 | Present | — |
| 4 | 0.9 | 20 | 40 | 1.7 | 0 | — | 39 | 1.0 | Present | 30/50/20 |
| 5 | 0.4 | 1200 | 1 | 1.7 | 0.051 | 0.25 | 49 | 1.0 | Present | 30/50/20 |
| 6 | 0.4 | 1200 | 400 | 1.7 | 0.051 | 100 | 69 | 1.0 | Present | 30/50/20 |

TABLE 4

| Example | Initial capacity (mAh/g) | Initial efficiency (%) | Battery swelling (%) | Remarks |
|---|---|---|---|---|
| 1 | 359 | 92.5 | 6.4 | |
| 2 | 359 | 92.5 | 5.3 | |
| 3 | 350 | 89 | 4.6 | |
| 4 | 359 | 91 | 7.1 | Sedimentation |
| 5 | 359 | 92.5 | 6.4 | |
| 6 | 350 | 89 | 6.0 | |
| 7 | 359 | 92.5 | 6.9 | |
| 8 | 359 | 92.5 | 5.7 | |
| 9 | 355 | 91.8 | 6.7 | |
| 10 | 350 | 91.2 | 6.7 | |
| 11 | 352 | 91.4 | 4.6 | |
| 12 | 359 | 92.5 | 5.7 | |
| 13 | 364 | 93 | 7.1 | |
| 14 | 364 | 93 | 13.0 | |
| 15 | 357 | 92 | 7.1 | |
| 16 | 350 | 88 | 4.9 | |
| 17 | 362 | 93 | 11.0 | |
| 18 | 355 | 92.6 | 6.7 | |
| 19 | 362 | 91 | 5.3 | |
| 20 | 355 | 89 | 4.2 | |
| 21 | 355 | 92 | 14 | |
| 22 | 362 | 94 | 12 | |
| 23 | 362 | 93 | 6.9 | |
| 24 | 359 | 92 | 6.2 | |
| 25 | 340 | 88 | 6.1 | |

TABLE 5

| Comparative example | Initial capacity (mAh/g) | Initial efficiency (%) | Battery swelling (%) | Remarks |
|---|---|---|---|---|
| 1 | 359 | 92.5 | 21 | |
| 2 | — | — | — | Solubility of CMC was insufficient |
| 3 | — | — | — | Preparation of slurry was difficult |
| 4 | 350 | 85 | 23 | Sedimentation |
| 5 | 349 | 89 | 21 | |
| 6 | 340 | 89.5 | 16 | |

As is clear from Table 4, the batteries of Examples produced good results regarding the initial capacity, initial efficiency, and battery swelling.

Examples 1 to 3 and Comparative Example 1 indicate that as the degree of etherification of CMC decreases, the battery swelling is reduced. In particular, between Comparative Example 1 and Example 1, there was a significant improvement in the effect of suppressing swelling. This is probably because the decrease in the degree of etherification caused the bonding strength between the active material particles to increase, thereby suppressing expansion of the negative electrode due to cycling.

On the other hand, due to the decrease in the degree of etherification, Example 3 exhibited a slight decrease in initial capacity and initial efficiency. In Comparative Example 2, the CMC powder did not dissolve in water sufficiently, thereby impeding the preparation of a negative electrode mixture slurry. This has indicated that by setting the range of the degree of etherification to 0.25 or more and 0.7 or less, preferably 0.4 or more and 0.7 or less, excellent characteristics can be obtained.

Examples 2, 4, and 5 and Comparative Example 3 indicate that the viscosity of the negative electrode mixture slurry lowers as the average degree of polymerization of CMC decreases. In Example 4, the degree of battery swelling was slightly larger than that of Example 1, and due to the decrease in viscosity, sedimentation was observed in the negative electrode mixture slurry. In Comparative Example 3, during the preparation of a negative electrode mixture slurry, the viscosity thereof was very high, and a homogenous negative electrode mixture slurry could not be obtained. This has indicated that by setting the range of the average degree of polymerization to 20 or more and 1200 or less, preferably 500 or more and 1200 or less, the effect of suppressing battery swelling increases, and that the workability in the negative electrode production process improves.

In Comparative Examples 5 and 6, these batteries exhibited a decrease in initial capacity and initial efficiency. Also, there was no effect in suppressing battery swelling. This is probably because the distribution state of the remaining particles comprising the water-insoluble portion of the CMC became uneven, and the remaining particles impeded the bonding between the active material particles without increasing the bonding strength between the active material particles.

The results of Examples 14 to 20 indicate that when the amount of CMC or SBR contained in the negative electrode mixture layer is small, the bonding strength between the active material particles tends to weaken. On the other hand, when the amount of CMC or SBR is large, the ratio of the active material in the negative electrode mixture layer decreases, and the initial capacity tends to lower. Therefore, the optimum amount of CMC is 0.9 part by weight or more and 2.7 parts by weight or less per 100 parts by weight of the active material particles, and the optimum amount of SBR is 0.5 part by weight or more and 1.5 parts by weight or less per 100 parts by weight of the active material particles.

The results of Examples 21 to 25 have confirmed that the use of a non-aqueous electrolyte containing PC is effective for suppressing battery swelling, compared with a non-aqueous electrolyte containing no PC. This is probably because covering the surfaces of the graphite particles with CMC suppresses decomposition of the graphite particles during charge and the use of PC suppresses gas evolution due to charge/discharge cycles.

In some of the Examples, the battery swelling was reduced to less than 10%, and the initial capacity was almost equal to the theoretical capacity of the negative electrode mixture layer. Accordingly, the effect of increasing the bonding strength between the active material particles according to the invention is very high in suppressing swelling of the negative electrode mixture layer.

INDUSTRIAL APPLICABILITY

The invention is generally applicable to lithium ion secondary batteries in which the negative electrode mixture layer contains active material particles with a graphite structure.

| Reference Signs List | |
|---|---|
| 10 | Battery Can |
| 10a | Bottom |
| 10b | Side Wall |
| 11 | Electrode Assembly |
| 12 | Positive Lead |

| Reference Signs List | |
|---|---|
| 13 | Negative Lead |
| 14 | Insulator |
| 15 | Seal Plate |
| 16 | Insulating Gasket |
| 17 | Negative Terminal |
| 19 | Seal Stopper |

The invention claimed is:

1. A negative electrode for a lithium ion secondary battery, comprising a negative electrode core member and a negative electrode mixture layer adhering to the negative electrode core member,
   wherein the negative electrode mixture layer includes active material particles with a graphite structure and a binder for bonding the active material particles,
   the binder includes a cellulose ether compound and rubber particles,
   the cellulose ether compound has a degree of etherification of 0.25 or more and 0.7 or less and an average degree of polymerization of 20 or more and 1200 or less,
   the negative electrode mixture layer contains remaining particles comprising a water-insoluble portion of the cellulose ether compound and having a mean particle size of 1 μm or more and 75 μm or less, and
   the bonding strength between the active material particles is 98 N/cm$^2$ or more.

2. The negative electrode for a lithium ion secondary battery in accordance with claim 1, wherein the degree of etherification is 0.4 or more and 0.7 or less, and the average degree of polymerization is 500 or more and 1200 or less.

3. The negative electrode for a lithium ion secondary battery in accordance with claim 1, wherein the amount of the cellulose ether compound is 0.9 part by weight or more and 2.7 parts by weight or less per 100 parts by weight of the active material particles, and the amount of the rubber particles is 0.5 part by weight or more and 1.5 parts by weight or less per 100 parts by weight of the active material particles.

4. The negative electrode for a lithium ion secondary battery in accordance with claim 1, wherein the cellulose ether compound is carboxymethyl cellulose sodium salt.

5. The negative electrode for a lithium ion secondary battery in accordance with claim 1, wherein the rubber particles are styrene butadiene rubber.

6. The negative electrode for a lithium ion secondary battery in accordance with claim 1, wherein the amount of the remaining particles comprising the water-insoluble portion is 0.0017 part by weight or more and 0.17 part by weight or less per 100 parts by weight of the active material particles.

7. A lithium ion secondary battery comprising:
   a positive electrode;
   the negative electrode of claim 1;
   a separator interposed between the positive electrode and the negative electrode; and
   a non-aqueous electrolyte.

8. The lithium ion secondary battery in accordance with claim 7, wherein the non-aqueous electrolyte includes a non-aqueous solvent and a lithium salt dissolved in the non-aqueous solvent, and the non-aqueous solvent contains propylene carbonate in an amount of 10% by volume or more and 70% by volume or less.

* * * * *